Patented June 11, 1935

2,004,156

2,004,156

PRESERVATION OF LATEX

Wallace Ellwood Cake, Boenet, Asahan, Sumatra, Dutch East Indies, assignor to General Rubber Company, New York, N. Y., a corporation of New Jersey No Drawing. Application December 24, 1931,
Serial No. 583,139

7 Claims. (Cl. 18—50)

This invention relates to improvements in methods of preserving latex and the products thereof.

The use of ammonia and phenols broadly for preserving latex against putrefaction is well known. It is common practice to preserve latex today with from about 1 to 1.25% ammonia. From theoretical considerations, the most satisfactory combination for latex preservation should consist of sufficient basic material to render the latex alkaline, in conjunction with sufficient germicide to prevent bacteria growth and the consequent development of acid in the latex and the resulting coagulation of the rubber therein. It seems unreasonable to employ ammonia, as is now the common practice, to exercise both these functions, for, while ammonia is a satisfactory alkali, its germicidal properties are so feeble that it must be used in concentrations greatly in excess of those necessary to obtain a satisfactory alkalinity in the latex. Ammonia, in amounts approximately 1% and over as now used, is an extremely expensive preservative and it is very desirable to reduce the cost of preserving latex as it is now carried out. The use of phenol or cresol as the active germicide in fresh latex results in immediate coagulation, likely due to the coagulation of the latex protein which is probably the only effective stabilizer in fresh latex.

This invention relates to the preservation of latex with a reduced amount of ammonia over that generally used and to the preservation of latex with substances entirely supplanting the use of ammonia. This invention further relates to the successful preservation of latex by means of phenolic material such as phenols and cresols.

I have found that satisfactory preservation of latex may be accomplished by the use of phenol and reduced amounts of ammonia over those generally used, if there is also present an alkali metal hydroxide or a soluble soap or both. I have further found that satisfactory preservation may be accomplished by the use of phenol in the total absence of ammonia if there is also present an alkali metal hydroxide, or an alkali metal hydroxide together with a soluble soap material. Where soap is used in the preservation of the latex, the phenol or cresol to be added is dissolved or emulsified in the soap solution. Where no soap is used, the phenol or cresol is dissolved or suspended in the alkali material. This method of introducing the phenol or cresol minimizes the chances for local coagulation of the rubber particles in the latex.

With the present embodiment in mind and without intending to limit the invention beyond what may be required by the prior art, the following specific examples may be given, the latices of each example being capable of satisfactory preservation over a long period of time.

Example 1

In the preservation of latex by means of phenol, ammonia, and soap, the phenol may be in proportions of .3 to .5%, the ammonia .1 to .3%, and the soap .2 to .5%. Latex preserved by such a composition has a very greatly reduced proportion of ammonia over that used in common practice where ammonia is used as the sole preservative.

Example 2

In the preservation of latex by means of phenol, ammonia, and alkali metal hydroxide, the preserving ingredients are added in the proportions of .3 to .5% phenol, .1 to .3% ammonia and .3 to .5% alkali metal hydroxide. In this example, as in the preceding example, the ammonia content may be reduced greatly below the 1 to 1¼% ammonia used in the usual preservation methods today.

Example 3

When both alkali metal hydroxide and soap are added to the phenol and ammonia, the following proportions are found to be very satisfactory: .3 to .5% phenol, .1 to .3% of ammonia, .1 to .5% soap, and .2 to .5% alkali metal hydroxide. In the above three examples, it will be noticed that the ammonia content may be kept below .3 of 1%.

Example 4

The ammonia may be eliminated entirely and a satisfactory preservation of the latex may be obtained by the use of .3 to .5% phenol and .2 to .5% alkali metal hydroxide. In this case, only the phenolic material and fixed alkali are present as preservative materials, thus reducing the cost of preservation by the complete elimination of the expensive ammonia.

Example 5

The latex may be preserved by phenol, together with alkali metal hydroxide, and also soap. In this case it is desired to have present .3 to .5% phenol and .2 to .5% alkali metal hydroxide and .1 to .5% soap. It has been found, as shown in all the examples, that .3 to .5% phenol produces a satisfactory preservative when used in conjunction with the other materials of the invention. The term "phenol" in the description and claims is to be considered broadly as covering phenol, its homologues or analogues, such as the more common phenol and cresol. The term "alkali metal hydroxide" in the claims is intended to include sodium and/or potassium hydroxides as the more common alkali metal hydroxides, as shown in the above examples.

With the detailed disclosure above given, it is obvious that modifications will suggest themselves and it is not desired to limit the invention otherwise than as set forth in the appended claims.

Having thus described my invention, what I claim and desire to protect by Letters Patent is:

1. Latex containing a preservative consisting of a small amount of phenol, soap, ammonia and alkali metal hydroxide.

2. Latex containing a preservative consisting of .3–.5% of phenol, .1–.5% soap, .1–.3% ammonia and .2–.5% alkali metal hydroxide.

3. Latex containing a preservative consisting of a small amount of phenol, soap and ammonia.

4. Latex containing a preservative consisting of .3–.5% of phenol, .2–.5% soap and .1–.3% ammonia.

5. Latex containing a preservative consisting of a small amount of phenol, soap and alkali metal hydroxide.

6. Latex containing a preservative consisting of .3–.5% of phenol, .1–.5% soap and .2–.5% alkali metal hydroxide.

7. Latex containing a preservative consisting of a small amount of phenol, soap and one or both of the following substances, ammonia and alkali metal hydroxide.

WALLACE ELLWOOD CAKE.